United States Patent [19]

Koizumi

[11] Patent Number: 4,896,165

[45] Date of Patent: Jan. 23, 1990

[54] MODULE FOR EXPANDABLE STRUCTURE AND EXPANDABLE STRUCTURE EMPLOYING SAID MODULE

[75] Inventor: Takayuki Koizumi, Hyogo, Japan

[73] Assignee: Mitsubishi Denki Kabushiki Kaisha, Tokyo, Japan

[21] Appl. No.: 248,928

[22] Filed: Sep. 23, 1988

[30] Foreign Application Priority Data

Sep. 24, 1987 [JP] Japan .................. 62-239370

[51] Int. Cl.$^4$ .......................................... H01Q 15/20
[52] U.S. Cl. ................................ 343/881; 343/880; 343/915
[58] Field of Search ............... 343/880, 881, 882, 878, 343/915, 916, DIG. 2; 52/108, 109, 645, 646

[56] References Cited

U.S. PATENT DOCUMENTS 4,532,742  8/1985  Miura ................................. 52/108

OTHER PUBLICATIONS

Large Space Antenna System Technology, 1984 W. Schneider, Entitled "Space Station Structures", pp. 375-392.

Lecturers of SLAM-12 Joint Meeting, pp. 25-28, 1986 Entitled "Structural Concepts and Relative Technology for Large-Sized Antenna," K. Miura, M. Natori & M. Sakamaki.

AIAA-88-0875 New Trends in Making Antenna Reflectors of 12th International Communication Satellite Systems Conference, Mar. 1988.

*Primary Examiner*—Rolf Hille
*Assistant Examiner*—Doris J. Johnson
*Attorney, Agent, or Firm*—Wolf, Greenfield & Sacks

[57] ABSTRACT

An expandable structure is formed by assembling together a plurality of structure modules each comprising a polygonal prism-shaped frame. Each pair of adjacent structure modules are connected together using frame members in common to form a hoop-shaped frame structure as a whole. Thus, it is possible to form a large-sized expandable structure, for example, an expandable antenna having an enlarged aperture. Since frame members of each pair of adjacent structure modules are used in common, it is possible to obtain a compact expandable structure.

27 Claims, 4 Drawing Sheets

MODULE FOR EXPANDABLE STRUCTURE AND EXPANDABLE STRUCTURE EMPLOYING SAID MODULE

BACKGROUND OF THE INVENTION:

The present invention relates to an expandable structure and, more particularly, to a structure such as an expandable antenna which is mounted on a large-sized artificial satellite or a large-scale space structure, together with a method of deploying such an expandable structure.

Expandable antennas for use in space, for example, those mounted on artificial satellites which are launched into space have heretofore been known. One type of conventional expandable antenna is disclosed, for example, in Japanese Patent Application No. 59-28704 (1984). The structure of this type of expandable antenna is shown in FIGS. 4 to 7, in which FIGS. 4 and 5 are front and side views, respectively, of the antenna which is in a packaged state, and FIGS. 6 and 7 are front and side views, respectively, of the antenna which is in an unfolded state.

Referring to the figures, each 180-degree hinge $1a$ incorporates a spring, for example, a spiral spring, which provides driving force required to unfold the antenna. The hinge $1a$ has a latch which locks it in the unfolded position when the angle of the hinge $1a$ reaches 180 degrees. Each 135-degree hinge $1b$ has an arrangement similar to that of the 180-degree hinges $1a$. More specifically, when the angle of the hinge $1b$ reaches 135 degrees, it is locked in this unfolded position. These hinges $1a$ and $1b$ are arranged such that frame members $2a$ and $2b$ can be unfolded under low-friction conditions.

The frame members $2a$ and $2b$ are connected together at their ends by means of the hinges $1a$ and $1b$ to thereby form a hoop-shaped antenna as a whole. In this arrangement, the frame members $2a$ are not expandable but only the frame members $2b$ are expandable. The frame members $2a$ and $2b$ are defined by tubular members.

A multiplicity of support wires 3 the tension of which is adjustable are secured to the frame members $2a$, $2b$ and the hinges $1a$, $1b$ at predetermined spacings so that a mesh-like flexible antenna member 4 is supported at its peripheral edge by these support wires 3. As shown in FIG. 7, two, upper and lower, flexible antenna members 4 are employed and these two antenna members 4 are independently retained by the respective support wires 3 and connected together through connecting wires 5 in such a manner that the antenna members 4 are pulled toward each other. The connecting wires 5 have different lengths such that the wire length gradually decreases from the peripheral edge of the antenna toward the center, thereby enabling the flexible antenna members 4 to constitute a spherical parabolic antenna. By forming at least one of the flexible antenna members 4 from a material having electrical conductivity (i.e., wave reflection properties), the antenna member 4 is enabled to function as an antenna.

The operation of the above-described conventional expandable antenna will next be explained. After the expandable antenna has been launched into space, the frame members $2a$ and $2b$ which are in the packaged state shown in FIGS. 4 and 5 begins to unfold, and the two flexible antenna members 4 which have been folded between the frame members $2a$ and $2b$ also begins to expand gradually as the frame members $2a$ and $2b$ unfold.

In the unfolding operation, the 180-degree hinges $1a$ which have been folded inside the frame members $2a$ and $2b$ in the packaged state are locked by the incorporated latches, respectively, when the hinge angle reaches 180 degrees, and the 135-degree hinges $1b$ which have been folded at the outer side of the packaged antenna are similarly locked when the hinge angle reaches 135 degrees. When all the hinges $1a$ and $1b$ are locked, a substantially octagonal hoop-shaped antenna such as that shown in FIG. 6 is formed. In addition, a predetermined level of tension is applied to the two flexible antenna members 4 through the support wires 3 and the connecting wires 5. Thus, spherical parabolic surfaces are formed.

The above-described conventional expandable antenna for use in space suffers, however, from the following problems. Since parabolic surfaces are defined by the flexible antenna members 4 which are stretched inside the frame members $2a$ and $2b$, it is necessary in order to ensure the required mirror surface accuracy to increase the number of support and connecting wires 3 and 5 and adjust the level of tension applied thereby, and this inevitably limits the size of the parabolic surfaces. Thus, it has heretofore been impossible to form an expandable antenna having a large aperture.

Further, when the frame members $2a$ and $2b$ are in a folded state, the axes of the two leaves of each of the hinges $1a$ and $1b$ extend parallel to the plane within which the antenna is unfolded. Therefore, the frame members $2a$ and $2b$ are likely to interfere with each other during an unfolding operation and the space required for the folded antenna is disadvantageously large.

SUMMARY OF THE INVENTION

In view of the above-described problems of the prior art, it is an object of the present invention to provide a structure module which is capable of forming an expandable structure for use in space having an enlarged aperture and which is also capable of minimizing the space required for the folded expandable structure.

It is another object of the present invention to provide an expandable structure formed by connecting together a plurality of said structure modules.

The expandable structure according to the present invention is formed by assembling together a plurality of structure modules each comprising a polygonal prism-shaped frame. Each pair of adjacent structure modules are connected using frame members in common to form a hoop-shaped frame structure as a whole.

According to the present invention, it is possible to form a large-sized expandable structure, for example, an expandable antenna having an enlarged aperture, by assembling together a plurality of structure modules. Since frame members of each pair of adjacent structure modules are used in common, it is possible to obtain a compact expandable structure.

The foregoing and other objects as well as the specific construction and operations of the present invention will become more apparent and understandable from the following detailed description of a few preferred embodiments thereof, when read in conjunction with the accompanying drawings.

DETAILED DESCRIPTION OF THE PREFERRED EMBODIMENTS

One embodiment of the present invention will be described hereinunder in detail with reference to the accompanying drawings.

Figure 1:
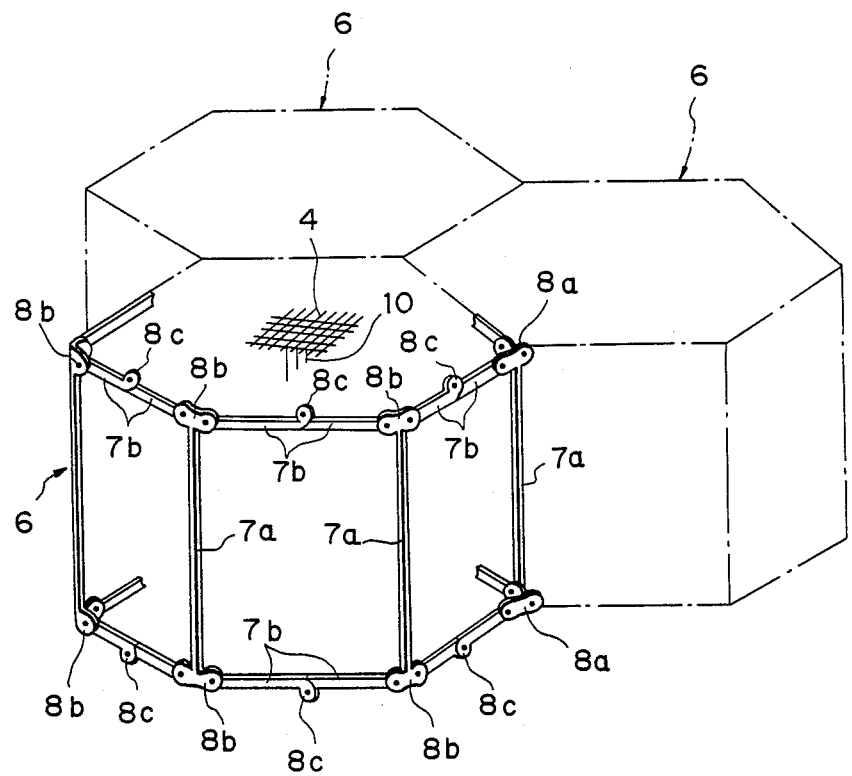
FIG. 1 schematically shows the arrangement of an expandable antenna according to one embodiment of the present invention.
Figure 2:
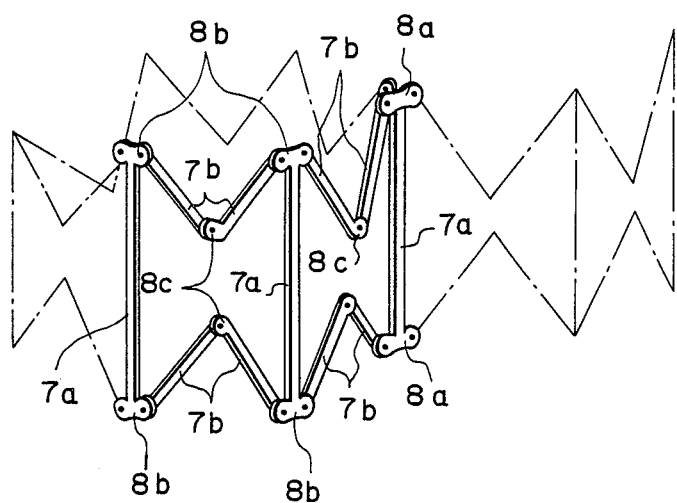
FIG. 2 shows the expandable antenna shown in FIG. 1 which is being unfolded.

FIG. 1 schematically shows an expandable antenna as one example of the expandable structure according to the present invention, the antenna being in an unfolded state, while FIG. 2 shows the expandable antenna shown in FIG. 1 which is being unfolded.

The feature of the present invention resides in that it is possible to form an expandable antenna having an enlarged aperture and fold the antenna in a compact packaged configuration. For these purposes, in the present invention a plurality (three in the embodiment) of structure modules 6 are employed and each module is provided with hinges 8a, 8b and 8c for using in common frame members at the joint of each pair of adjacent structure modules 6.

More specifically, as shown in FIG. 1, each structure module comprises vertical frame members 7a, horizontal frame members 7b, three-way hinges 8a each connecting together frame members extending in three different directions within a polygonal plane defined by the horizontal frame members 7b, two-way hinges 8b each connecting together frame members extending in two different directions within the polygonal plane, and one-way hinges 8c each connecting together frame members extending in one straight line within the polygonal plane.

The three-way hinges 8a are employed at the joint where each pair of adjacent structure modules 6 are connected together. Vertical and horizontal frame members 7a and 7b are connected together in such a manner that at the joint of each pair of structure modules vertical frame members 7a are used in common and one of the three horizontal frame members 7b which are connected together is also used in common.

The two-way hinges 8b are employed to connect together frame members which define the vertices of each structure module 6 unfolded in the shape of a polygonal prism. The two-way hinges 8b are arranged to open and close through a predetermined angle (120°) in the same way as in the case of the three-way hinges 8a.

The one-way hinges 8c are employed for the purpose of minimizing the space occupied by the folded antenna and also of preventing the interference between the frame members when a plurality of structure modules 6 are connected together. More specifically, each horizontal frame member 7b is separated into two members at the longitudinally central position, and these two members are connected together through a one-way hinge 8c. By virtue of the one-way hinges 8c, each structure module 6 can be folded and unfolded within the planes which are perpendicular to the polygonal plane, that is, the peripheral surfaces of the structure module 6. Thus, since the area which is occupied by the horizontal frame members 7b when the expandable antenna is folded is determined by the area of the longitudinal section of the frame members, the area occupied by the horizontal frame members 7b can be made considerably smaller than that in the case of the prior art. In addition, since the horizontal frame members 7b are unfolded within the planes which are different from the plane within which the expandable antenna is unfolded, it is advantageously possible to prevent the frame members from interfering with each other when a plurality of structure modules 6 are unfolded.

Figure 3:
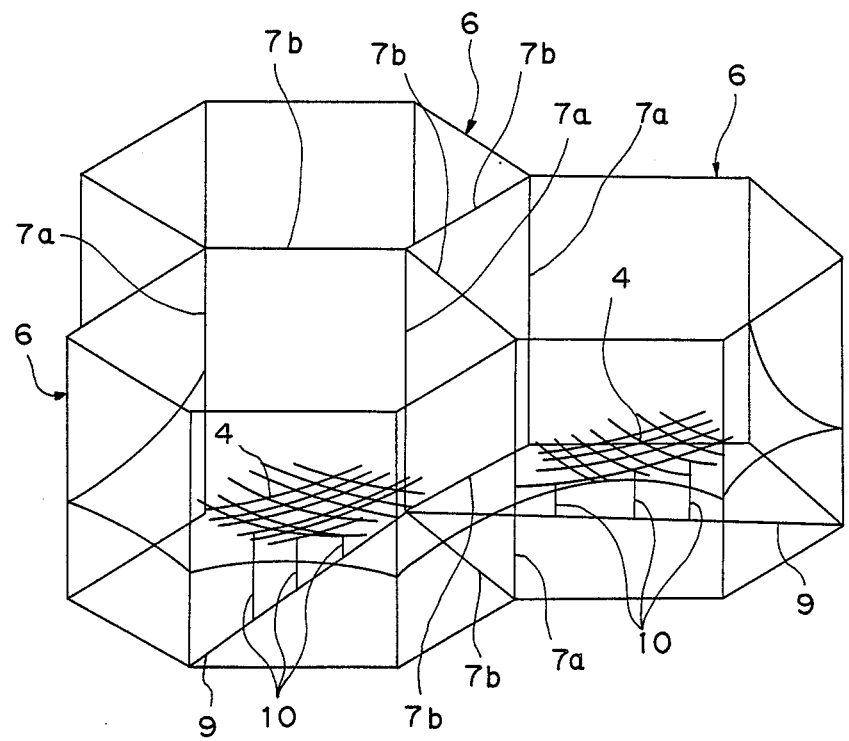
FIG. 3 shows one example of the way of stretching flexible antenna members which define antenna surfaces.
Figure 4:
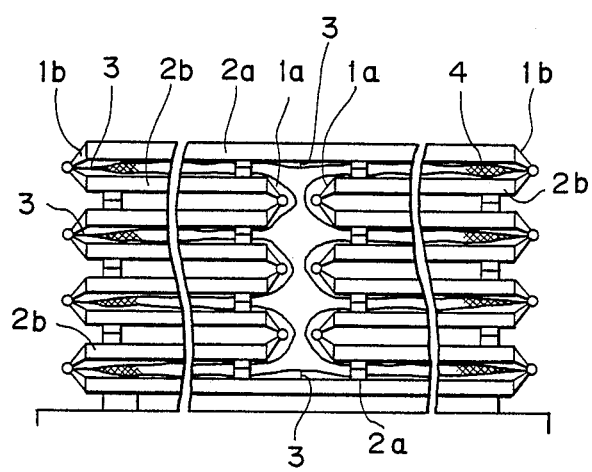
FIG. 4 is a front view showing a conventional expandable antenna which is in a packaged state.
Figure 5:
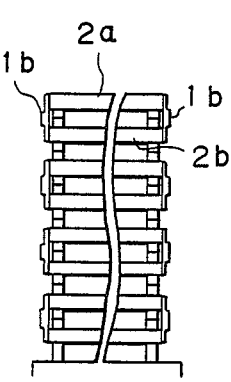
FIG. 5 is a side view of the conventional expandable antenna shown in FIG. 4.
Figure 6:
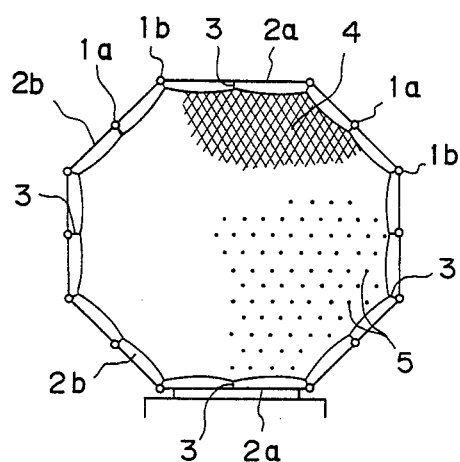
FIG. 6 is a front view showing the conventional expandable antenna which is in an unfolded state.
Figure 7:
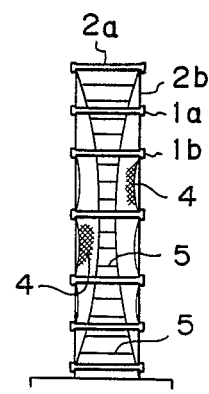
FIG. 7 is a side view of the conventional expandable antenna shown in FIG. 6.

Referring next to FIG. 3, which shows the way of stretching flexible antenna members 4 in this embodiment, the flexible antenna members 6 which are stretched in all the three structure modules 6 are combined together to form a parabolic surface as a whole. The flexible antenna members 4 may be stretched in such a manner that each pair of flexible antenna members are connected together through connecting wires as in the case of the aforementioned prior art. In the arrangement shown in FIG. 3, however, one flexible antenna member 4 is stretched such as to define one parabolic surface by the use of support wires 9 stretched between opposing hinges and connecting wires 10 with different lengths which connect together the flexible antenna member 4 and the support wires 9.

The following is a description of the operation of this embodiment. As shown in FIG. 2, the expandable antenna is packaged in a state wherein all the one-way hinges 8c are folded and in this state the antenna is transported to a place where it is used. When it is to be used in space, the folded expandable antenna is accommodated inside a fairing at the tip of a rocket that has a diameter of about 2 m.

When an expandable antenna is formed from three structure modules as in the case of this embodiment, the projected sectional area of the antenna (i.e., the area occupied by the folded antenna) is not 3 times the projected sectional area of a structure module but is equal to an area obtained by subtracting therefrom the sum of the projected sectional areas of four vertical frame members 7a and six horizontal frame members 7b, which are used in common. Further, according to the packaging method of the embodiment, the horizontal frame members 7b are folded within the outer peripheral wall surfaces of the antenna, as shown in FIG. 2, and therefore the area occupied by each structure module 6 can be reduced to the sum of the sectional areas of six vertical frame members 7a and the sectional areas of twelve horizontal frame members 7b.

In general, assuming that the number of structure modules 6 is n, the sums Sa and Sb of projected sectional areas of vertical and horizontal frame members 7a and 7b are given as follows:

$$Sa = 4n + 2 (n \geq 1)$$

$$Sb = 8n + 6 (n \geq 2) \qquad (1)$$

The total area is smaller than that in the case where no shared members or portions are used, i.e., Sa+Sb=18 n. It will be clear that the area occupied by the folded antenna decreases markedly as the number of structure modules 6 increases.

Driving force required to unfold the expandable antenna which is in a packaged state and deploy it completely is obtained from mechanical springs (not shown) incorporated in the two-way hinges 8b or small-sized motors (not shown) associated with these hinges. Completion of deployment of the antenna may be detected according to whether or not the opposing end faces of the two members constituting each horizontal frame member 7b has butted against each other or whether or not the angle between each horizontal frame member 7b and the corresponding vertical frame member 7a has reached 90 degrees at the corresponding two-way hinge 8b.

To ensure the overall rigidity of the unfolded structure, a latch may be provided in each one-way hinge 8c or near the central articulated portion of each horizontal frame member 7b so that each horizontal frame member 7b comprising two members, together with a one-way hinge 8c, functions as one complete frame member.

As to the formation of a parabolic surface from the flexible antenna members 4, the method that has been described as a prior art may be adopted for each structure module. To form a large-aperture parabolic surface, the flexible antenna member 4 of each structure module 6 may be stretched so as to define a part of a large-aperture parabolic surface, as shown in FIG. 3. More specifically, the flexible antenna members 4 are retained at their intermediate positions on the vertical frame members 7a which are positioned at the outer periphery of the expandable antenna, and the antenna members 4 are pulled at various positions by means of the connecting wires 10 so that a parabolic surface is formed concentrically with respect to the expandable antenna. It is a matter of course that the antenna member retaining positions of the vertical frame members 7a which are disposed at positions other than the outer periphery of the expandable antenna also need to be adjusted so that a parabolic surface is effectively formed.

Although in the foregoing embodiment, the present invention has been described by way of one example in which it is applied to an expandable antenna, the present invention may also be applied to a solar cell paddle equipped with photoelectric transducers which generate electricity on receipt of sunlight in space.

Although in the foregoing embodiment the present invention is applied to an expandable antenna wherein a parabolic surface is formed using flexible antenna members 4, the present invention may also be applied to a synthetic aperture antenna or radar wherein the flexible antenna member stretched in each structure module 6 is arranged to define a simple flat surface on which are provided transmitting and receiving devices and a signal which covers a large area is equivalently reproduced from signals from all the devices.

Further, although in the foregoing embodiment the number of structure modules is three, there is no particular restriction on the number of modules employed. If problems concerning material, machining accuracy or deployment timing are solved, it is possible to combine together from several tens to several hundreds of structure modules 6 to thereby realize an expandable structure having an aperture of several tens of meters.

As has been described above, according to the present invention, a plurality of structure modules are connected together in such a manner that frame members at the joint of each pair of adjacent modules are used in common. Accordingly, it is possible to obtain a large-aperture expandable antenna for use in space or a large-area expandable structure with an advantageously compact packaged configuration.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A foldable, self-expanding module for supporting a planar structure comprising:
   a plurality of rigid frame members, disposed perpendicularly to the plane of said planar structure;
   a plurality of hinged frame members, each of said hinged frame members being divided into a first frame piece and a second frame piece, said first frame piece and said second frame piece having folded and unfolded positions;
   a first hinge for interconnecting said first and second frame pieces;
   said first and second frame pieces in their unfolded position extending along a first substantially linear axis, said first hinge having a pivot axis that is spacedly offset from said frame piece axis;
   second hinges for connecting each of said hinged frame members between two of said rigid frame members;
   said first and second hinges being arranged so that, in the folded state, said first frame piece and said second frame piece are disposed perpendicularly to the plane of said planar structure.

2. The module according to claim 1, wherein said rigid fram members have end portions and said hinged frame members have end portions and said second hinges connect together said end portions of said rigid frame members vertical and said end portions of said hinged frame members.

3. The module according to claim 1, wherein, when said module is in an unfolded state, said rigid frame members and said hinged frame members are disposed perpendicularly.

4. The module according to claim 1, wherein said module, when unfolded, has the shape of a hexagonal prism.

5. The module according to any one of claims 1 to 4, wherein, in the folded state, said first frame piece and said second frame piece are disposed substantially parallel to said rigid frame members.

6. The module according to claim 5, further comprising latches incorporated in at least some of said first hinges, said latches operating when said module is unfolded to fix the position of said at least some of said first hinges thereby preventing said hinged frame members from returning to their folded position after said module has been unfolded.

7. The module according to claim 1, further comprising a flexible planar antenna structure secured to said module, said antenna structure being arranged so that, when said module is in a folded state, said antenna structure is accommodated within said module in a folded state, whereas when said module is unfolded, said antenna structure is stretched within said module.

8. The module according to claim 1, wherein mechanical springs are incorporated in some of said second hinges so that said module is unfolded by means of resilient forces derived from said mechanical springs.

9. The module according to claim 1, wherein motors are attached to some of said second hinges so that said module is unfolded by means of driving forces derived from said motors.

10. The module according to claim 1 wherein said first hinge comprises end portions of said respective frame pieces extending substantially transverse to said frame piece axis.

11. The module according to claim 10 wherein said pivot axis, in the unfolded position, is disposed externally to a periphery defined by said hinged frame members and said rigid frame members of said module.

12. The module according to claim 11 wherein said first and second frame pieces are of equal length.

13. The module according to claim 12 wherein said first hinges are located at the midpoint of said hinged frame members.

14. The module according to claim 1 wherein said rigid frame members extend along a second substantially linear axis that is perpendicular to said first linear axis, said second hinge having at least one pivot axis that is spacedly offset from said second linear axis along said first linear axis.

15. The module of claim 1 wherein said second hinges comprise two pivot axes that interconnect two of said hinged frame members.

16. A modular, expandable framework for supporting a planar structure comprising a plurality of foldable, self-expanding modules;
   each of said modules supporting a section of said planar structure and comprising:
   a plurality of rigid frame members, disposed perpendicularly to the plane of said planar structure;
   a plurality of hinged frame members, each of said hinged frame members being divided into a first frame piece and a second frame piece, said first frame piece and said second frame piece being connected by a first hinge;
   said first and second frame pieces, in an unfolded state, extending along a first substantially linear axis and each having an end portion extending substantially perpendicularly from said frame pieces with said first hinge formed in said end portions so that said first hinge is offset with respect to the axis of said first and second frame pieces in their unfolded state;
   second hinges for connecting each of said hinged frame members between two of said rigid frame members;
   said first and second hinges being arranged so that, in the folded state, said first frame piece and said second frame piece are disposed perpendicularly to the plane of said planar structure;
   said modules being connected together with at least some of said rigid frame members shared between at least two modules.

17. The framework according to claim 16, wherein said rigid frame members have end portions and said hinged frame members have end portions and said second hinges connect together said end portions of said rigid frame members vertical and said end portions of said hinged frame members.

18. The framework according to claim 16, wherein, when each of said modules is in an unfolded state, said rigid frame members and said hinged frame members are disposed perpendicularly.

19. The framework according to claim 16, wherein each of said modules, when unfolded, has the shape of a hexagonal prism.

20. The framework according to any one of claims 16 to 19, wherein, in the folded state, said first frame piece and said second frame piece are disposed substantially parallel to said rigid frame members.

21. The framework according to claim 20, further comprising latches incorporated in at least some of said first hinges, said latches operating when a corresponding one of said modules is unfolded to fix the position of said at least some of said first hinges thereby preventing said hinged frame members from returning to their folded position after said module has been unfolded.

22. The framework according to claim 16, further comprising a flexible planar antenna structure having a plurality of sections, each of said sections being secured to one of said modules, said sections of said antenna structure being arranged so that, when one of said modules is in a folded state, an antenna structure section secured thereto is accommodated within said one module in a folded state, whereas when said one module is unfolded, said antenna structure secured thereto is stretched within said one module.

23. The framework according to claim 16, wherein mechanical springs are incorporated in some of said second hinges so that at least some of said modules are unfolded by means of resilient forces derived from said mechanical springs.

24. The framework according to claim 16, wherein motors are attached to some of said second hinges so that at least some of said modules are unfolded by means of driving forces derived from said motors.

25. A modular, expandable antenna comprising:
   a plurality of foldable, self-expanding framework modules, each of said framework modules supporting a section of said antenna and comprising:
   a plurality of rigid frame members, disposed perpendicularly to the plane of said planar structure;
   a plurality of hinged frame members, each of said hinged frame members being divided into a first frame piece and a second frame piece, said first frame piece and said second frame piece being connected by a first hinge;
   said first and second frame pieces, in an unfolded state, extending along a first substantially linear axis and each having an end portion extending substantially perpendicularly from said frame pieces with said first hinge formed in said end portions so that said first hinge is offset with respect to the axis of said first and second frame pieces in their unfolded state;
   second hinges for connecting each of said hinged frame members between two of said rigid frame members;
   said first and second hinges being arranged so that, in the folded state, said first frame piece and said second frame piece are disposed perpendicularly to the plane of said planar structure;
   said modules being connected together with at least some of said rigid frame members shared between at least two modules; and
   a plurality of flexible antenna sections, the circumference of each of said antenna sections being secured to one of said modules, said antenna sections being arranged so that, when one of said modules is in a folded state, an antenna section secured thereto is accommodated within said one module in a folded state, whereas when said one module is unfolded, said antenna section secured thereto is stretched within one module.

26. A modular antenna according to claim 25 further comprising means for attaching each of said antenna sections to a respective one of said modules both at the circumference of said each antenna section and at points not on the circumference of said each antenna section.

27. The modular antenna according to claim 26 wherein said attaching means is adjusted to curve said antenna sections so that the antenna formed from all of said antenna sections has a spherical parabolic shape.

* * * * *